United States Patent [19]
Yokono et al.

[11] Patent Number: 4,714,636
[45] Date of Patent: Dec. 22, 1987

[54] LIQUID CRYSTAL DEVICE FOR COLOR DISPLAY

[75] Inventors: Koujiro Yokono, Yokohama; Masaru Kamio, Atugi; Yukitoshi Ohkubo, Yokohama, all of Japan

[73] Assignee: Canon Kabushiki Kaisha, Tokyo, Japan

[21] Appl. No.: 722,397

[22] Filed: Apr. 12, 1985

[30] Foreign Application Priority Data

Apr. 20, 1984 [JP] Japan .................................. 59-79891

[51] Int. Cl.$^4$ .............................................. C09K 3/34
[52] U.S. Cl. .................................. 428/1; 350/339 F; 428/702
[58] Field of Search ................. 428/1, 702; 350/339 F

[56] References Cited

U.S. PATENT DOCUMENTS 3,832,034  8/1974  Edmonds .................... 350/339 F

FOREIGN PATENT DOCUMENTS 4595  1/1979  Japan ................................ 350/339 F
137565  10/1980  Japan ............................ 350/339 F

*Primary Examiner*—Alexander S. Thomas
*Attorney, Agent, or Firm*—Fitzpatrick, Cella Harper & Scinto

[57] ABSTRACT

A color filter with a good heat resistance is provided on a base plate for a liquid crystal device by vapor deposition of a colorant. Transparent electrodes are formed on the color filter and the thus formed base plate is combined with the other base plate having thereon a TFT circuit for driving a liquid crystal interposed between the base plates. Thus a liquid crystal color display device having a structure suited for driving is provided.

5 Claims, 2 Drawing Figures

LIQUID CRYSTAL DEVICE FOR COLOR DISPLAY

BACKGROUND OF THE INVENTION

The present invention relates to a liquid crystal device for color display and more particularly to a liquid crystal device for color display provided with a color filter.

A liquid crystal device generally has a structure having a pair of base plates and a liquid crystal sandwiched therebetween. On a face of the base plates contacting the liquid crystal are formed elements such as electrodes and others so that the state of the liquid crystal is controlled by the elements to effect a display. A uniformly extending electrode disposed on the surface of one of the two base plates, and a plurality of electrodes in the form of small block patterns (picture elements) are formed on the surface of the other base plate.

Among the liquid crystal devices in this category, a display device using a scheme for matrix-driving a large number of picture elements as disclosed in Japanese Laid-Open Patent Application No. 17599/1975 has been watched with keen interest.

In order to make use of such a liquid crystal device, it has been proposed to provide a color filter on each electrode on one base plate having a semiconductor driving circuit thereon or on a counter electrode formed on the other base plate. A liquid crystal used for a color display comprises a large number of picture elements (as many as, for example, 480×640 picture elements formed by 480 scanning lines and 640 information signal lines) and thus there can be a problem that a sufficient electric field required for switching is not applied to a liquid crystal. Therefore, it is necessary to minimize the decrease in effective voltage applied to the liquid crystal. In this respect, the provision of a color filter on an electrode results in a decrease in the effective voltage applied to the liquid crystal and it is also not suitable for a display device constituted with such a large number of picture elements as described above.

A base plate provided with a semiconductor driving circuit has a sectional structure as shown in FIG. 1 and has much unevennesses as understood from the sectional view, so that it is difficult to form color filters at a rate of about 5 to 20 filters per millimeter thereon. More specifically, FIG. 1 is a schematic sectional view of a portion of a liquid crystal display device having an array of TFTs (thin film transistors) where a TFT is formed. In the figure, a letter S indicates a transparent base plate of, e.g., glass on which are successively disposed a gate electrode 1, an insulating layer 2 of, e.g., SiN:H, a semiconductor layer 3, an ohmic contact layer 4 and a source electrode. Further a drain electrode 6 is provided connected with a picture element-forming electrode 7 formed on the base plate S.

On the other hand, it has been also proposed to provide below an electrode a color filter formed by a polyvinyl alcohol film dyed with a colorant. However, such a dyed color filter can cause fading of color due to heating because an electrode film of, e.g., indium tin oxide is formed thereon by the electron beam process or sputtering process while heating the base plate provided with the color filter at 200°–300° C., whereby it is difficult to form a color filter with a sufficient color density.

SUMMARY OF THE INVENTION

An object of the present invention is to provide a liquid crystal device for color display provided with a good color balance.

According to the present invention, there is provided a liquid crystal device for color display comprising a pair of oppositely spaced base plates, and a liquid crystal disposed between the base plates, at least one of the oppositely spaced base plates being provided on the surface thereof contacting the liquid crystal with a color filter comprising a layer of colorant formed by vapor deposition, and a transparent electrode formed on the color filter.

The present invention is particularly based on the discovery that, especially when the above mentioned colorant layer is given as a film formed by vapor deposition of a colorant selected from phthalocyanine compounds, perylene compounds, isoindolinone compounds, anthraquinone compounds and quinacridone compounds, the electrode film of, e.g., indium tin oxide formed by electron beam process or sputtering process under heating, the colorant layer does not fade even at the temperature (200°–300° C.) for the electrode formation, whereby a color filter with a good and desired color balance can be provided on a base plate for a liquid crystal device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2:
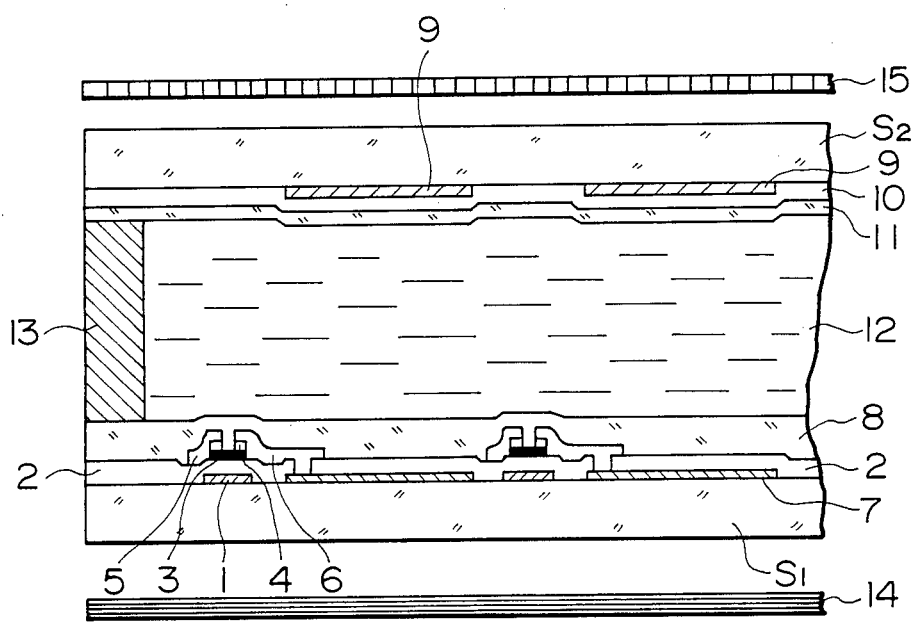
FIG. 2 is a partial sectional view showing an embodiment of the liquid crystal device according to the present invention.

An embodiment of the present invention will be described with reference to the accompanying drawing. FIG. 2 is a partial sectional view of a color display cell according to the present invention for use in a transmission mode.

Figure 1:
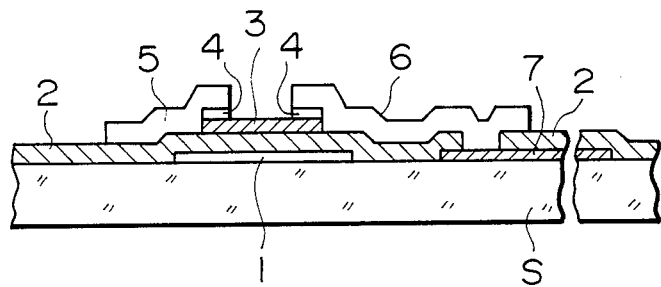
FIG. 1 is a partial sectional view of a base plate for a liquid crystal device of the prior art.

In the embodiment shown in FIG. 2, on a lower base plate $S_1$ of, e.g., glass is formed a TFT structure, in which the parts denoted by reference numerals 1–7 correspond to the parts denoted by the same reference numerals shown in FIG. 1 and will be explained briefly later. The lower base plate $S_1$ is disposed to face an opposite base plate $S_2$ with a color filter 9 and a counter electrode 10, and the medium of a liquid crystal layer 12 is interposed therebetween. The thickness of the liquid crystal layer 12 is determined by a spacer 13. The counter electrode 10 is an indium tin oxide film which is formed by a vapor deposition process such as the electron beam process or the sputtering process. The electron beam process and the sputtering process per se are well known and the details thereof are described, e.g., by Akira Kinbara, "Hakumaku no Kihon Gijutsu (Basic Techniques for Thin Films)", published from the Book Publishing Section of Tokyo University (Dec. 15, 1976).

The base plates $S_1$ and $S_2$ contact the liquid crystal layer 12 further through insulating layers 8 and 11, respectively.

The color filters 9 are respectively a layer of colorant formed by vapor deposition and are disposed between the transparent base plate $S_2$ and the counter electrode 10 and at parts corresponding to picture element-forming electrodes 7, thus forming color segments.

In order to effect a color display of a natural color or full color, filter segments of, e.g., three colors of blue (B), green (G) and red (R) are used in the case of the additive mixture of colors. One full color picture element is constituted by a combination of these three color segments. The shape of the color segments may be of square, rectangular, circular, polygonal or any other shape. The thickness of the color filter may be of the order of 1000 Å to 1μ.

A masking layer (not shown) of, e.g., a metal film may also be disposed at the parts corresponding to the gate lines and source lines on the counter base plates so as to boarder the color segments for the purpose of shielding the semiconductor layer of the TFT and enhancing the clarity of images.

As the colorant forming the color filter through vapor deposition, there may be used various kinds of colorants including pigments and dyes of acetaceticanilides, monoazonaphthols, polycyclic compounds, disperse type, oil soluble type, indanthrenes, phthalocyanines, etc. Especially preferred classes of the colorants are those of phthalocyanine compounds, perylene compounds, isoindolinone compounds, anthraquinone compounds and quinacridone compounds.

Examples of preferred colorants are enumerated as follows:

Phthalocyanines such as metal-free phthalocyanine, copper phthalocyanine, berillium phthalocyanine, magnesium phthalocyanine, zinc phthalocyanine, titanium phthalocyanine, tin phthalocyanine, lead phthalocyanine, vanadium phthalocyanine, chromium phthalocyanine, molybdenum phthalocyanine, manganese phthalocyanine, iron phthalocyanine, cobalt phthalocyanine, nickel phthalocyanine, palladium phthalocyanine, and platinum phthalocyanine.

Perylene colorants such as Paliogen Red L3870HD (supplied from BASF), Paliogen Red L3880HD (ditto), Navoperm Red BL (Hoechst), Pelindo Maroon R6434 (Bayer), Pelindo Red R6418 (ditto), Helio Fast Maroon E3R (ditto), Kayaset Scarlet E-2R (Nihon Kayaku), Kayaset Bordeaux E-D (ditto), and Irgazine Red BPT (Ciba Guigy).

Isoindolinone colorants such as Irgazine Yellow 2GLD, 2GLTE and 2GLTN (Ciba Geigy), Lionogen Yellow 3GX (Toyo Ink), Fastgen Super Yellow GR, GRO and GROH (Dai Nippon Ink), Irgazine Yellow 2RLT, 3RLT and 3RLTN (Ciba Geigy), Lionogen Yellow RX (Toyo Ink), Lithol Fast Yellow 1840 (BASF), Kayaset Yellow E-2RL and E-3RL176 (Nihon Kayaku), Chromophthal Orange 2G (Ciba Geigy) and Irgadine Red 2BLT (ditto).

Anthraquinone colorants such as Chromophthal Yellow A2R (Ciba Geigy) (C.I. 70600), Helio Fast Yellow E-3R (Bayer), Paliogen Yellow L1560 (BASF) (C.I. 68420), Kayaset Yellow E-R (Nihon Kayaku) (C.I. 65049), Chromophthal Yellow AGR (Ciba Geigy), Bayplast Yellow E2G (Bayer), Nihonthrene Yellow GCN (Sumitomo Kagaku) (C.I. 67300), Mikethrene Yellow GK (Mitsui Toatsu) (C.I. 61725), Indanthrene Printing Yellow GOK (Hoechst) (C.I. 59100), Anthrazol Yellow V (ditto) (C.I. 60531), Mikethrene Soluble Yellow 12G (Mitsui Toatsu) (C.I. 60605), Mikethrene Yellow GF (ditto) (C.I. 66510), Nihonthrene Yellow GGF (Sumitomo Kagaku) (C.I. 65430), Indanthrene Yellow 3G (Bayer) (C.I. 65405), Nihonthrene Yellow 4GL (Sumitomo Kagaku), Indanthrene Yellow 5GK (Bayer) (C.I. 65410), Cibanone Yellow 2G (Ciba Geigy), Indanthrene Yellow F2GC (Hoechst), Anthrazol Yellow IGG (ditto), Indanthrene Yellow 4GF (BASF), Mikethrene Yellow 3GL (Mitsui Toatsu), Indanthrene Yellow LGF (BASF), Monolite Yellow FR (I.C.I.) and Kayaset Yellow E-AR.

Quinacridone colorants such as Lionogen Magenta R (Toyo Ink), Fastgen Super Magenta R and RS (Dai Nippon Ink), Cinquacia Red BRT and YRT (DuPont), and Cinquacia Violet BRT (ditto).

An especially preferred combination may comprise one of a red (R) colorant selected from the perylene compounds, a green (G) colorant selected from the phthalocyanine compounds and a blue (B) colorant selected from the phthalocyanine compounds.

These colorants are formed into a film of a segment pattern by using a mask having corresponding shapes of openings or by selective heating for each display element, or by first forming into a uniform film entirely on a base plate and then patterning it by applying a photolithographic technique such as dry etching or lifting-off.

Other members on the base plates are now briefly explained.

The gate electrode 1 and the source electrode 5 are formed of a film of a metal such as Al, Au, Ag or Pd. The semiconductor layer 3 is formed of amorphous silicon, polysilicon, tellurium, CdS or CdSe. The drain electrode 6 and the picture element-forming electrode 7 are formed of a film of a transparent conductor such as $SnO_2$, $In_2O_3$ or indium tin oxide, or a metal such as Au, Al or Pd.

The insulating layers 8 and 11 are formed of various organic polymers or resins such as polyparaxylylene, acrylic resin, polyethylene, epoxy resin, polyamide, polyimide and rubbers, or insulating inorganic compounds including metal oxides such as silicon oxide and titanium oxide, and silicon nitride.

These insulating layers 8 and 11 may also be used as orientation controlling films for orientating liquid crystal molecules in advance in accordance with display modes. These insulating layers 8 and 11 may be provided with an orientation controlling function, for example, by rubbing them after formation thereof on the base plates either through the color filter or not by vapor deposition or coating, or by oblique or title vapor deposition if they are made of materials capable of vapor deposition. Particularly, the insulating layers 8 and 11 thus provided with a monoaxially orientation controlling function may be arranged with their orientation controlling directions, e.g., rubbing directions, crossing each other at right angles, so that they can be used in the twisted nematic liquid crystal mode. In this instance, a pair of polarizers 14 and 15 are arranged to form cross nicols or parallel nicols outside the base plates $S_1$ and $S_2$, respectively.

As described hereinabove, by the use of a color filter having a good color balance given as a layer of colorant formed by vapor deposition, the present invention produces the following advantageous effects:

(1) It is possible to form electrodes on the color filter, whereby a display cell structure most suited for driving is provided.

(2) A color display cell with a high reliability with respect to heat resistance and weatherability is provided.

The display device according to the present invention is applicable to a television receiver, a monitor for video cameras, etc., as a small-size display device with excellent driving characteristic, productivity and reliability as well as a high packaging density of picture elements.

What is claimed is:

1. A liquid crystal device for color display, comprising:
    a pair of oppositely spaced base plates having facing surfaces;
    a liquid crystal disposed between the facing surfaces of the base plates so as to form a plurality of picture elements;
    a plurality of color filters formed on the facing surface of one of the base plates so as to provide each picture element with a color filter; each individual color filter having a blue, green or red color; and
    a transparent electrode formed on the plurality of color filters; each of said color filters comprising a vapor-deposited colorant layer of an organic pigment; said colorant layer having a thickness of about 1,000 angstroms to 1 micron.

2. The liquid crystal device according to claim 1, wherein said transparent electrode comprises a film of indium tin oxide formed through vapor deposition by the electron beam process.

3. The liquid crystal device according to claim 1, wherein said transparent electrode comprises a film of indium tin oxide formed through vapor deposition by the sputtering process.

4. The liquid crystal device according to claim 1, wherein said layer of colorant is formed of a film of a colorant selected from the group consisting of phthalocyanine compounds, perylene compounds, isoindolinone compounds, anthraquinone compounds and quinacridone compounds.

5. The liquid crystal device according to claim 1, wherein said at least one of the oppositely spaced base plates has an orientation controlling layer of an insulating material covering the color filter and the transparent electrode.

* * * * *